(12) United States Patent
Golden

(10) Patent No.: US 8,376,446 B2
(45) Date of Patent: Feb. 19, 2013

(54) STOW-ABLE RIGID PICKUP TRUCK BED COVER

(76) Inventor: Ryan Golden, Washington, MI (US)

(*) Notice: Subject to any disclaimer, the term of this patent is extended or adjusted under 35 U.S.C. 154(b) by 226 days.

(21) Appl. No.: 12/795,804

(22) Filed: Jun. 8, 2010

(65) Prior Publication Data

US 2010/0308617 A1    Dec. 9, 2010

Related U.S. Application Data

(60) Provisional application No. 61/185,370, filed on Jun. 9, 2009.

(51) Int. Cl.
*B60P 7/02*        (2006.01)
(52) U.S. Cl. ................. 296/100.03; 296/100.01
(58) Field of Classification Search ............ 296/100.01, 296/100.02, 100.03, 100.06
See application file for complete search history.

(56) References Cited

U.S. PATENT DOCUMENTS

| | | | |
|---|---|---|---|
| 4,313,636 A | | 2/1982 | Deeds |
| 4,394,100 A | * | 7/1983 | Sperlich ............................ 410/2 |
| 4,695,087 A | * | 9/1987 | Hollrock ........................ 296/14 |
| 4,848,830 A | * | 7/1989 | Parson ........................... 296/165 |
| 4,900,080 A | * | 2/1990 | Morris, II ................. 296/100.06 |
| 5,427,428 A | | 6/1995 | Erickson et al. |
| 5,961,173 A | * | 10/1999 | Repetti ......................... 296/37.6 |
| 6,106,051 A | | 8/2000 | Miskowic |
| 6,170,900 B1 | | 1/2001 | Kooiker |
| 6,186,575 B1 | * | 2/2001 | Fisher et al. ............. 296/100.03 |
| 6,217,103 B1 | * | 4/2001 | Schultz et al. ........... 296/100.09 |
| 6,224,138 B1 | * | 5/2001 | Adsit et al. ............... 296/100.05 |
| 6,276,735 B1 | | 8/2001 | Champion |
| 6,565,141 B1 | | 5/2003 | Steffens et al. |
| 6,702,359 B2 | * | 3/2004 | Armstrong et al. ....... 296/100.02 |
| 6,824,190 B1 | * | 11/2004 | Rogers ..................... 296/100.09 |
| 6,827,389 B1 | | 12/2004 | Pandorf |
| 6,880,878 B2 | * | 4/2005 | Nykiel et al. ............. 296/100.02 |
| 6,883,855 B2 | | 4/2005 | Chverchko et al. |
| 6,902,222 B2 | * | 6/2005 | Nykiel et al. ............. 296/100.02 |
| 7,021,693 B2 | | 4/2006 | Keller |
| 7,131,684 B1 | | 11/2006 | Gooding |
| 7,188,888 B2 | | 3/2007 | Wheatley |
| 7,320,494 B1 | | 1/2008 | Wilson |
| 7,537,264 B2 | * | 5/2009 | Maimin et al. ........... 296/100.09 |
| 2002/0021019 A1 | * | 2/2002 | Bohm et al. ............. 296/100.02 |
| 2003/0184115 A1 | * | 10/2003 | Armstrong et al. ....... 296/100.06 |
| 2003/0193209 A1 | * | 10/2003 | Melvani ................... 296/100.02 |
| 2005/0046224 A1 | * | 3/2005 | Nykiel et al. ............. 296/100.02 |
| 2005/0046225 A1 | * | 3/2005 | Nykiel et al. ............. 296/100.02 |
| 2006/0279099 A1 | * | 12/2006 | Ranka et al. ................. 296/37.6 |
| 2007/0296240 A1 | * | 12/2007 | Geise ......................... 296/100.06 |
| 2009/0189405 A1 | * | 7/2009 | Kokladas ...................... 296/37.6 |
| 2010/0127529 A1 | * | 5/2010 | Elliott et al. ............. 296/100.09 |
| 2010/0171334 A1 | * | 7/2010 | Crandall ....................... 296/37.6 |
| 2011/0225739 A1 | * | 9/2011 | Hanrahan .......................... 5/709 |

* cited by examiner

*Primary Examiner* — Lori Lyjak
(74) *Attorney, Agent, or Firm* — Fraser Clemens Martin & Miller LLC; J. Douglas Miller

(57) ABSTRACT

A protective cover for a truck bed having a pair of opposite sidewalls includes a main body selectively configurable in a stored position and a protective position, wherein the main body is disposed adjacent the truck bed while in the stored position and shelters at least a portion of the truck bed while in the protective position and a means for securing the main body to at least one of the sidewalls of the truck bed while the main body is in the protective position.

18 Claims, 12 Drawing Sheets

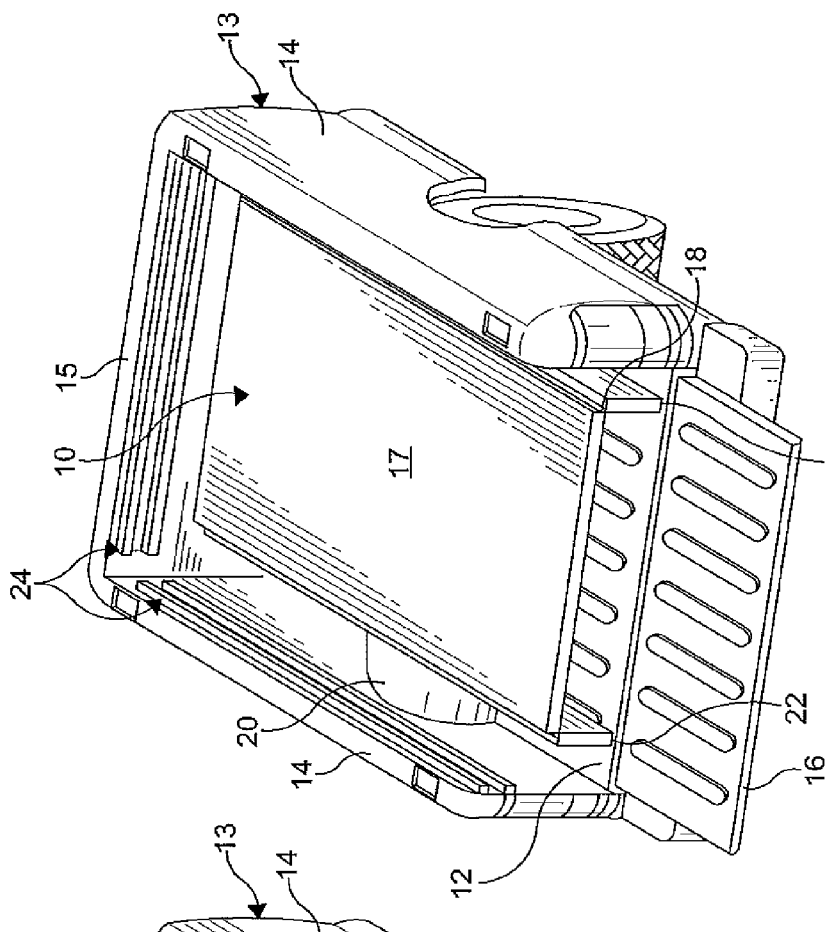
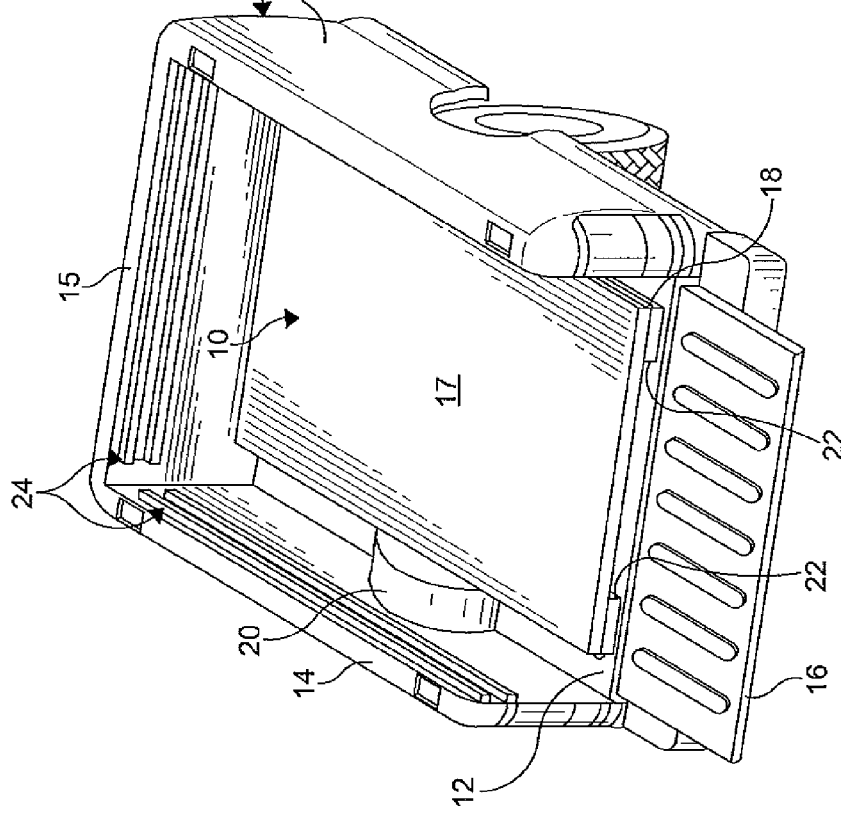

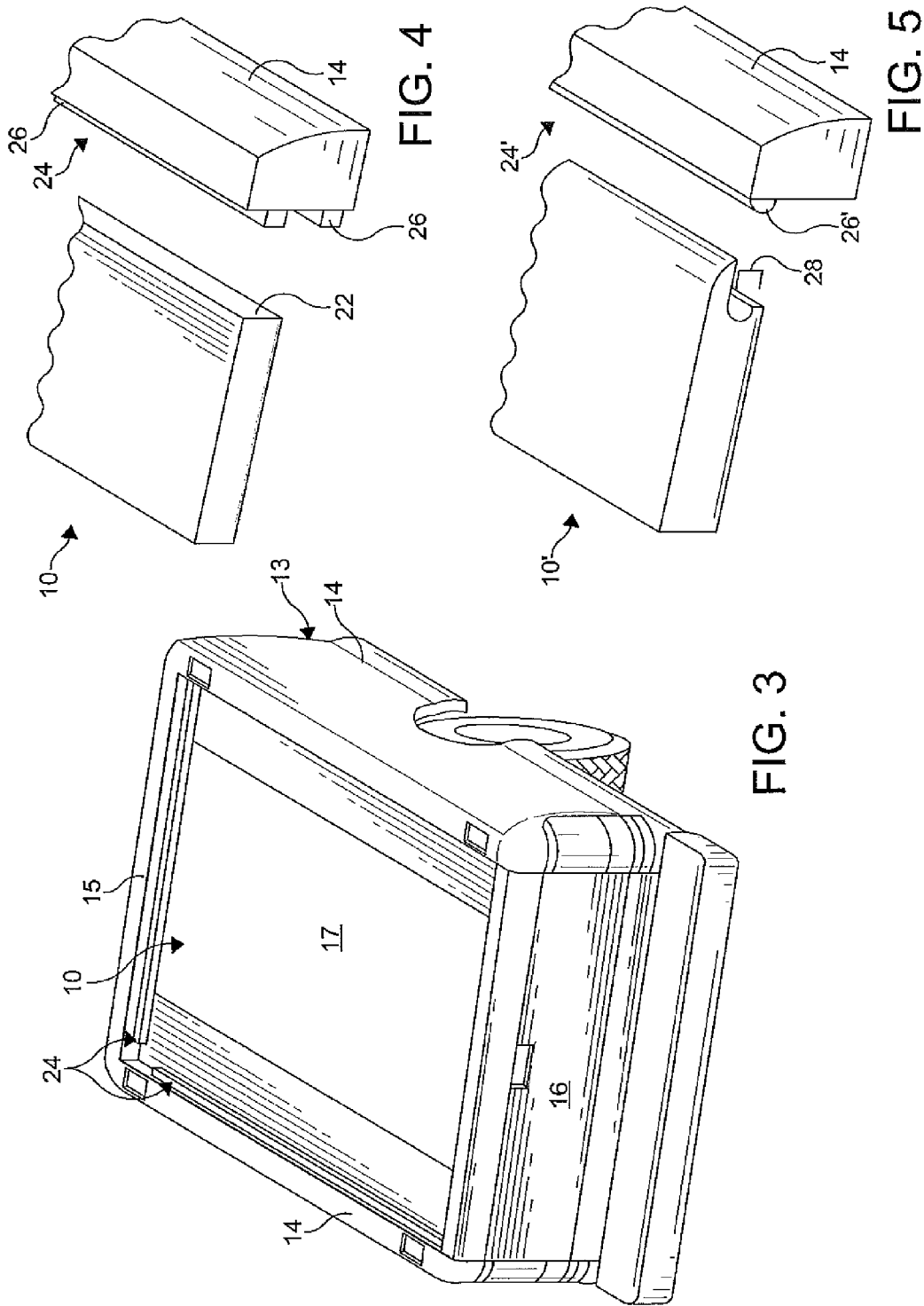

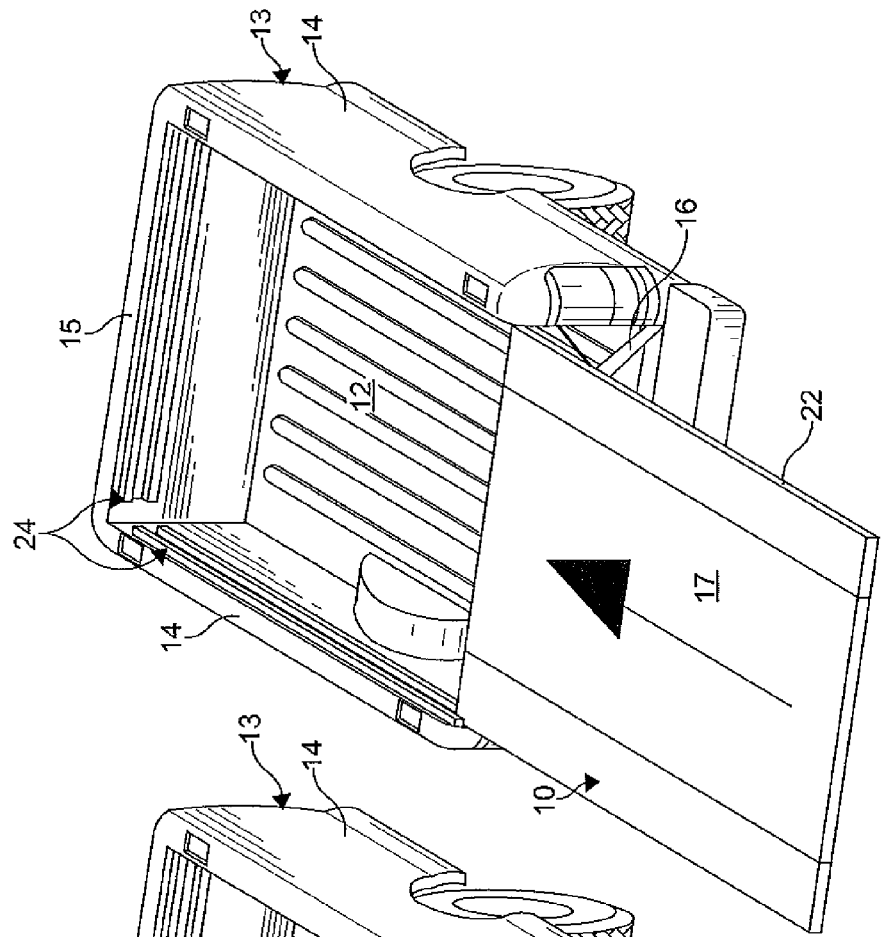
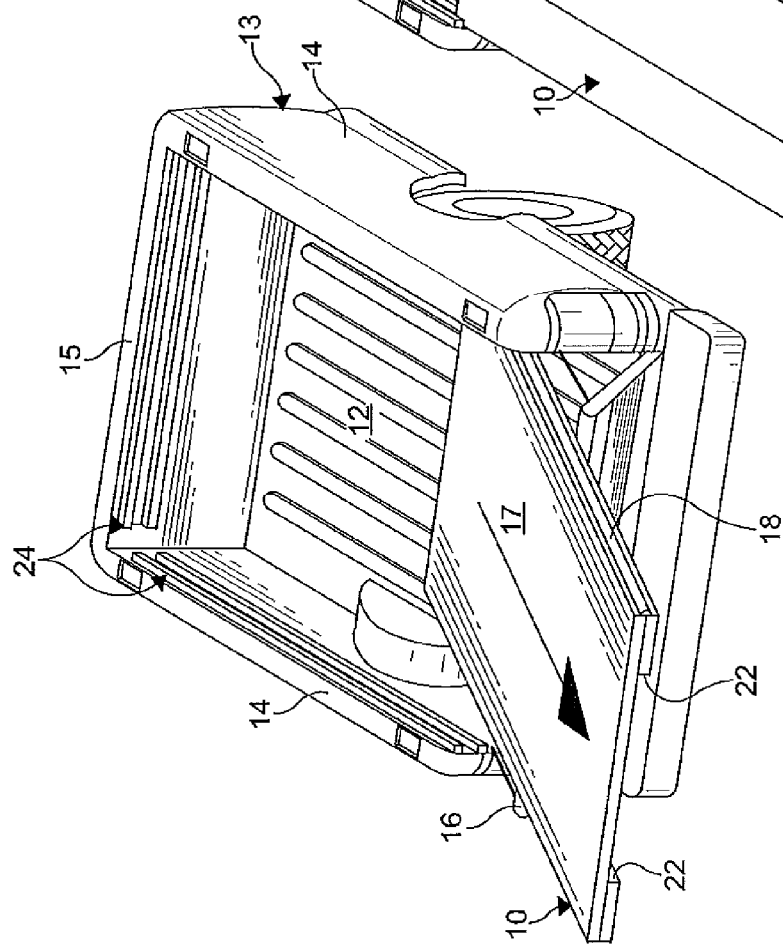

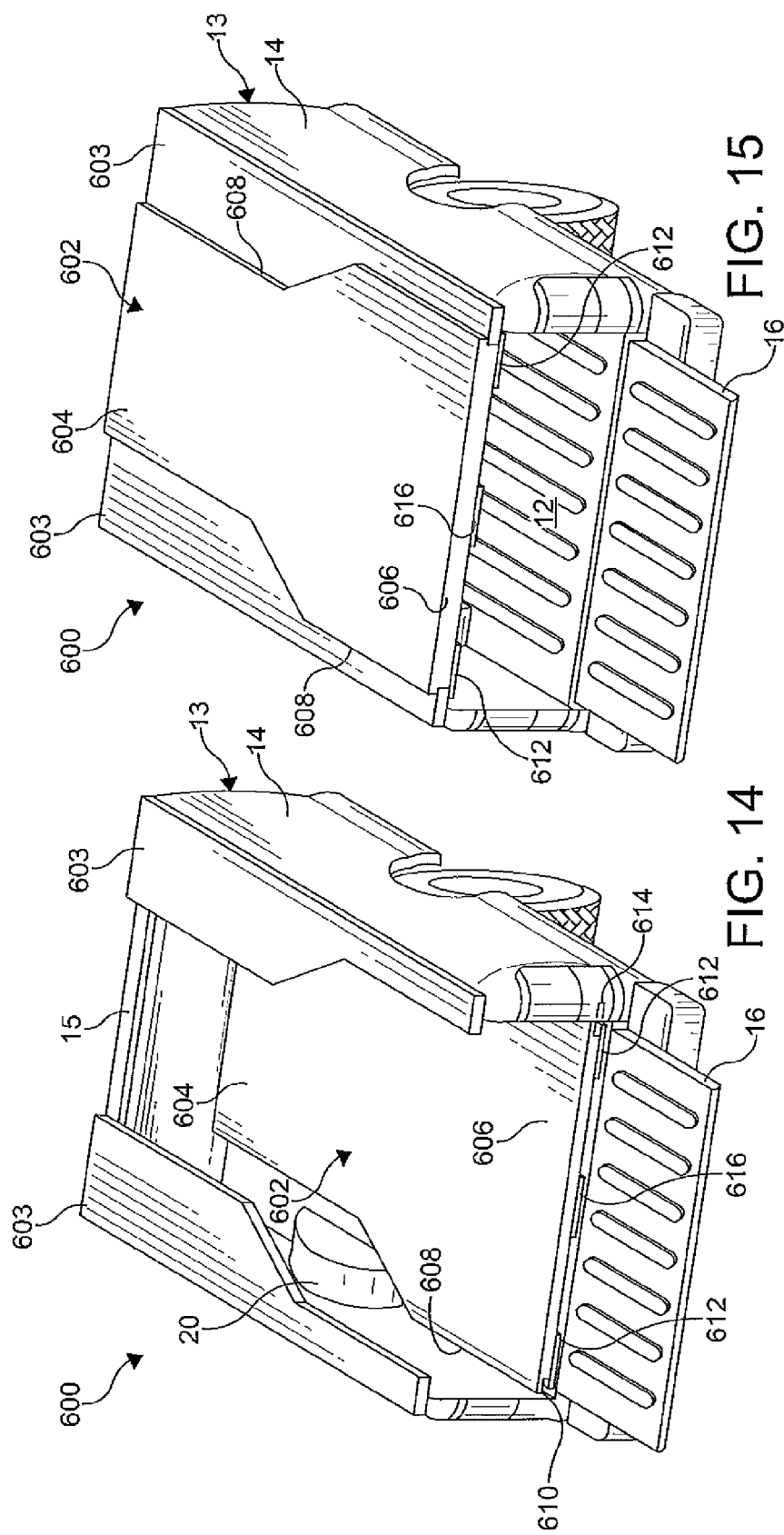

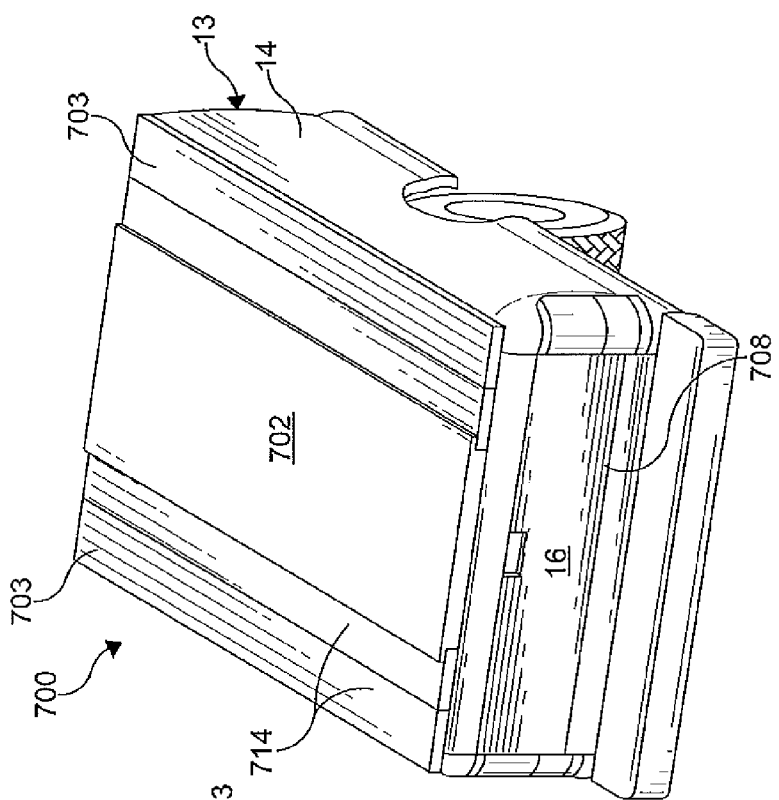
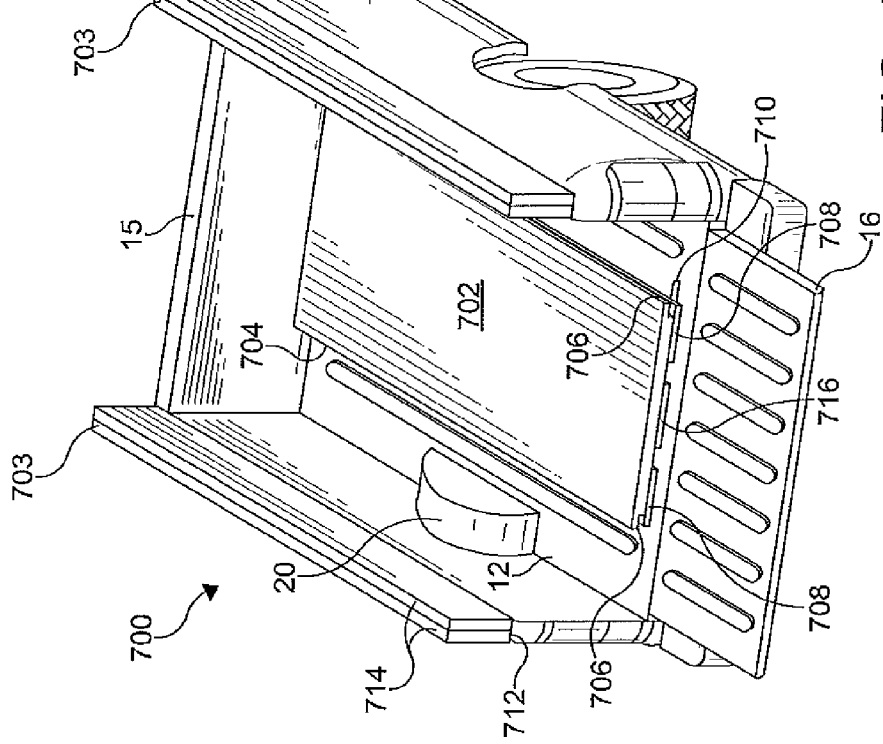

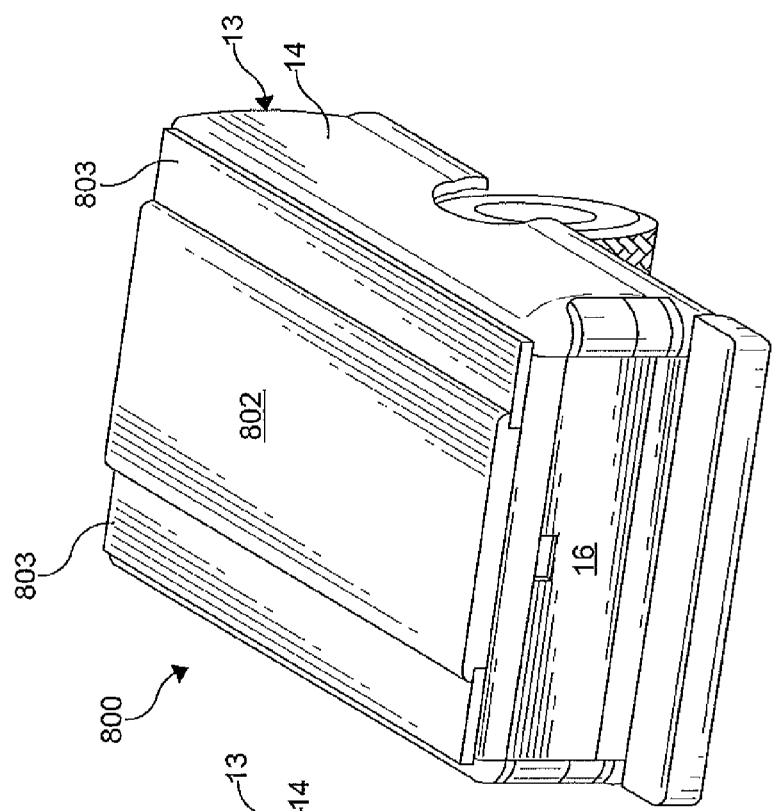
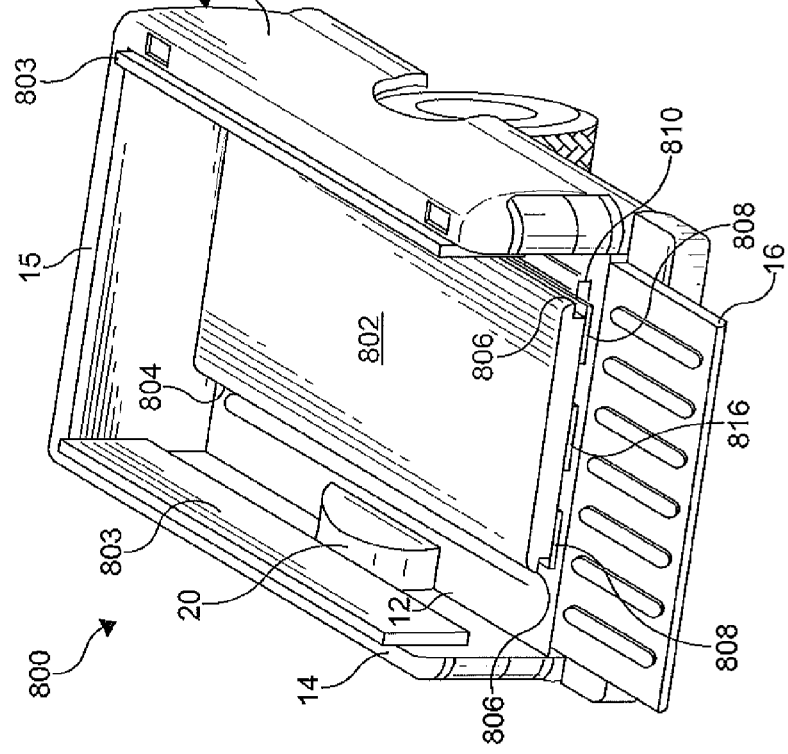
FIG. 18
FIG. 19

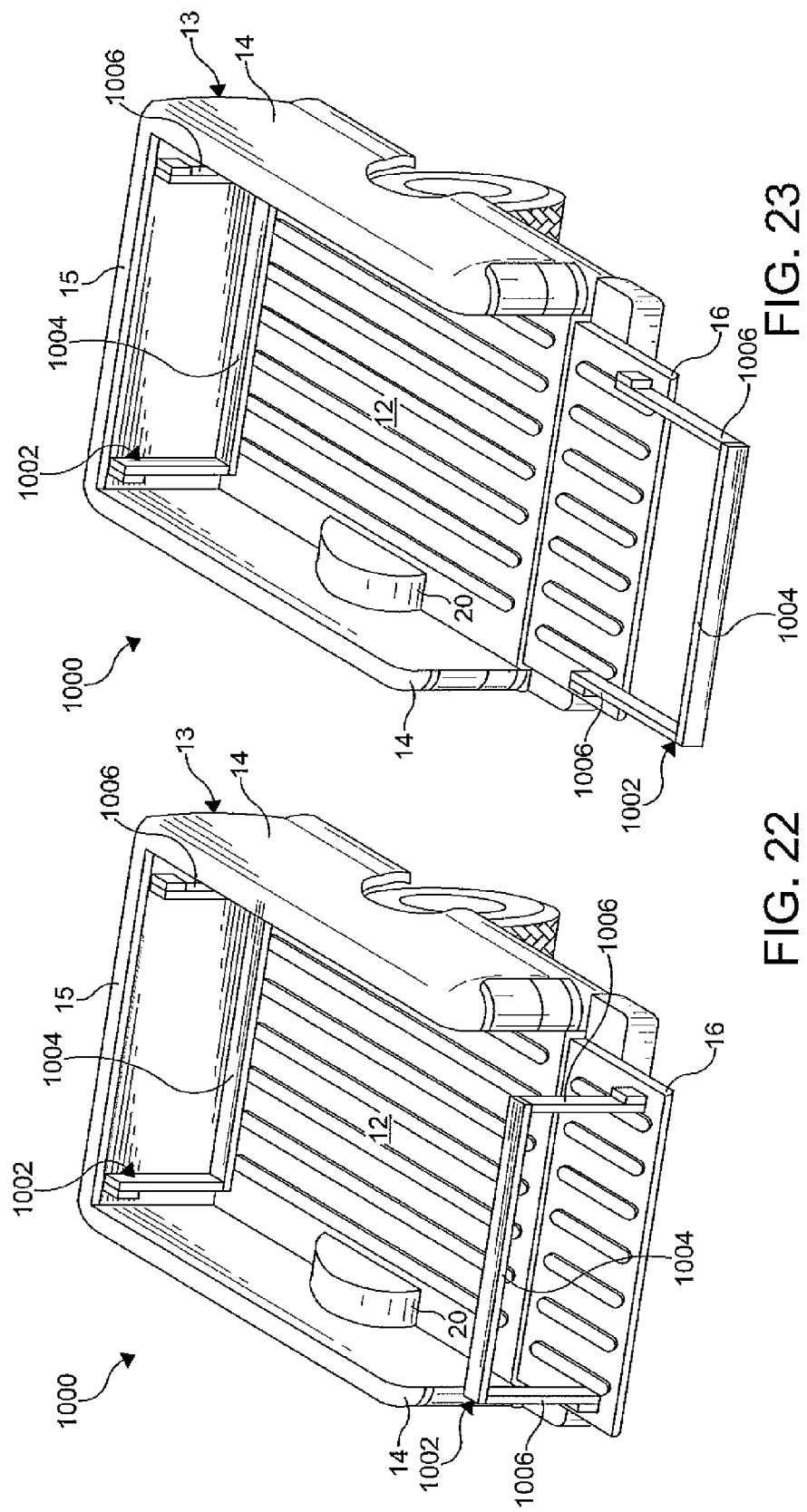

STOW-ABLE RIGID PICKUP TRUCK BED COVER

CROSS-REFERENCE TO RELATED APPLICATIONS

The present application claims priority to U.S. Provisional Patent Application Ser. No. 61/185,370 filed Jun. 9, 2009, hereby incorporated herein by reference in its entirety.

FIELD OF THE INVENTION

The present invention relates generally to a truck bed cover. More particularly, the invention is directed to a protective cover capable of being stored on a truck bed.

BACKGROUND OF THE INVENTION

Several soft and hard tonneau pickup truck covers are available on the market today. Soft covers are subject to cuts and tears, difficult to remove and install, exhibit undesirable contraction and expansion with temperature variations, and require clumsy ribs across the bed to support the cover. Certain hard, one-piece covers can only be opened from a tailgate end of the cover, which limits the height of the objects that can be transported. Alternatively, other hard, one piece, covers have to be removed and stored when transporting large objects.

It is desirable to produce a protective cover that provides fast and easy, single-person installation and removal, wherein the protective cover is stow-able without consuming valuable cargo space during transportation.

SUMMARY OF THE INVENTION

Concordant and consistent with the present invention, a protective cover that provides fast and easy, single-person installation and removal, wherein the protective cover is stow-able without consuming valuable cargo space during transportation, has surprisingly been discovered.

In one embodiment, a protective cover for a truck bed having a pair of opposite sidewalls comprises: a main body selectively configurable in a stored position and a protective position, wherein the main body is disposed adjacent the truck bed while in the stored position and shelters at least a portion of the truck bed while in the protective position; and a means for securing the main body to at least one of the sidewalls of the truck bed while the main body is in the protective position.

In another embodiment, a protective cover for a truck bed having a pair of opposite sidewalls, comprises: a main body having a plurality of longitudinal seams arranged substantially parallel to the sidewalls, wherein the main body is foldable along the seams to form a stored position and a protective position, and wherein the main body is disposed adjacent the truck bed while in the stored position and shelters at least a portion of the truck bed while in the protective position; and a means for securing the main body to the at least one of the sidewalls of the truck bed.

The invention also provides methods for protecting a truck bed.

One method comprises the steps of: providing a protective cover having a main body selectively configurable in a stored position and a protective position, wherein the main body is disposed adjacent the truck bed while in the stored position and shelters at least a portion of the truck bed while in the protective position; and providing a moveable support member coupled to the bed of the truck; positioning the support member at a pre-determined position relative to the protective cover; guiding the protective cover along the support member to remove the cover from the stored position; and guiding the protective cover along the support member to arrange the cover in the protective position.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which:

FIG. 1 is a perspective view of a truck bed including a protective cover according to an embodiment of the present invention, showing the protective cover in a stored position;

FIG. 2 is a perspective view of a truck bed including the protective cover of FIG. 1, showing the protective cover in a shelf position;

FIG. 3 is a perspective view of a truck bed including the protective cover of FIG. 1, showing the protective cover in an expanded protective position;

FIG. 4 is a fragmentary perspective view of a track system for securing the protective cover of FIGS. 1-3 in the expanded protective position according to an embodiment of the present invention;

FIG. 5 is a fragmentary perspective view of a track system for securing a protective cover in a protective position according to another embodiment of the present invention;

FIGS. 7A-7C are each a perspective view of a truck bed including the protective cover of FIG. 1, showing a step-by-step installation process;

FIG. 14 is a perspective view of a truck bed including a protective cover according to another embodiment of the present invention, showing the protective cover in a stored position;

FIG. 15 is a perspective view of a truck bed including the protective cover of FIG. 14, showing the protective cover in an expanded protective position;

FIG. 16 is a perspective view of a truck bed including a protective cover according to another embodiment of the present invention, showing the protective cover in a stored position;

FIG. 17 is a perspective view of a truck bed including the protective cover of FIG. 16, showing the protective cover in an expanded protective position;

FIG. 18 is a perspective view of a truck bed including a protective cover according to another embodiment of the present invention, showing the protective cover in a stored position;

FIG. 19 is a perspective view of a truck bed including the protective cover of FIG. 18, showing the protective cover in an expanded protective position;

FIGS. 22-24 are perspective views of a truck bed including a structural support system according to an embodiment of the present invention.

DETAILED DESCRIPTION OF EXEMPLARY EMBODIMENTS OF THE INVENTION

Figure 7A:
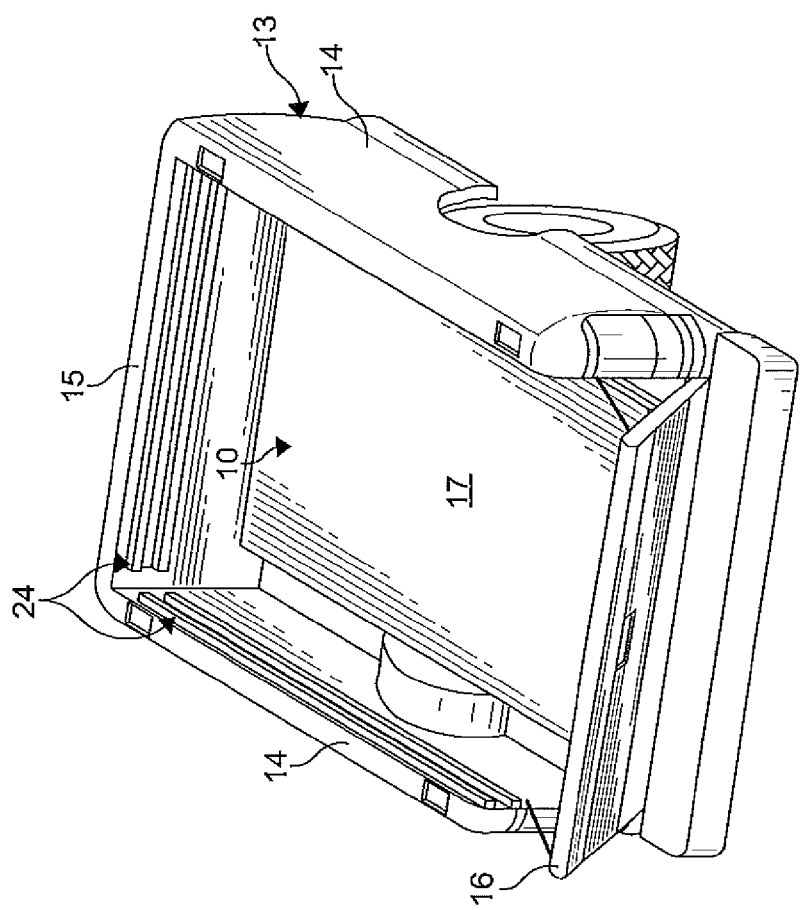

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

FIGS. 1-3 illustrate a protective cover 10 for enclosing a truck bed 12 of a pickup truck 13 according to an embodiment of the present invention. The truck 13 further includes a pair of opposing sidewalls 14, each of the sidewalls 14 disposed adjacent an opposite edge of the truck bed 12, a front wall 15 coupled to the sidewalls 14 and the truck bed 12, and a tailgate 16 hingedly coupled to the truck bed 12 and disposed opposite the front wall 15. It is understood that the truck bed 12 can have any size and shape.

The protective cover 10 includes a main body 17 typically formed from at least one of a polymer, a composite, a wood, and a metal. However, other suitable rigid or semi-rigid materials can be used. As shown, the protective cover 10 includes a plurality of longitudinal seams or hinges 18 arranged substantially parallel to each of the sidewalls 14 of the truck bed 12. In certain embodiments, the protective cover 10 may include a plurality of solar panels (not shown) disposed on the main body or integrated therein. It is understood that any photovoltaic technology or solar energy device may be used.

As more clearly shown in FIG. 1, the protective cover 10 may be situated in a stored or folded position, wherein the protective cover 10 is sized to lay flat on the truck bed 12 (i.e. substantially parallel to the truck bed 12) and between a pair of wheel wells 20.

As more clearly shown in FIG. 2, the protective cover 10 may be situated in a shelf position, wherein a pair of opposite side edges 22 of the protective cover 10 are folded to secure the protective cover 10 between the wheel wells 20 in the truck bed 12 to function has a bed protector and storage shelf.

FIG. 3 shows the protective cover 10 is in an expanded protective position wherein the side edges 22 of the protective cover 10 are disposed adjacent the sidewalls 14 of the truck bed 12. In certain embodiments, a portion of the protective cover 10 may be designed to overlap a portion of each of the sidewalls 14 when in the protective position to minimize leakage of water or other materials into the covered truck bed 12.

In certain embodiments, the protective cover 10 is retained in the protective position using a track system 24. FIG. 4 illustrates a non-limiting example of the track system 24 coupled to the front wall 15 and each of the sidewalls 14. As shown, the track system 24 includes a pair of spaced apart guide tracks 26 coupled to each of the sidewalls 14, wherein the guide tracks 26 are spaced to receive one of the side edges 22 of the protective cover 10 to retain the cover 10 therebetween. It is understood that the protective cover 10 may be coupled to the sidewalls 14 using any coupling means such as a clamping device and a tie down device, for example.

FIG. 5 illustrates a track system 24' according to another embodiment of the present invention similar to the track system 24 of FIG. 4, except as described below. Variations of structure shown in FIG. 4 include the same reference numeral and a prime (') symbol. As shown, the track system 24' includes a guide rail 26' coupled to each of the sidewalls 14. Each of the side edges 22' of the cover 10' includes a reciprocal groove 28 formed therein, the groove 28 sized to receive one of the guide rails 26' therein to retain the cover 10' on the sidewalls 14, while a portion of the protective cover 10' overlays each of the sidewalls 14 to minimize water leakage into the truck bed 12. As a non-limiting example, the guide tracks 26' each have a substantially cylindrical shape in cross section. However, it is understood that the guide tracks 26 may have any shape and size.

Figure 6:
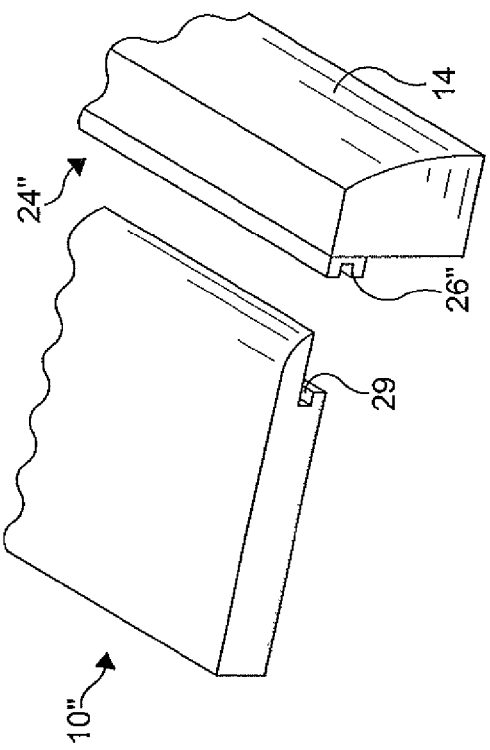
FIG. 6 is a fragmentary perspective view of a track system for securing a protective cover in a protective position according to another embodiment of the present invention.

FIG. 6 illustrates a track system 24" according to another embodiment of the present invention similar to the track system 24 of FIG. 4, except as described below. Variations of structure shown in FIG. 4 include the same reference numeral and a double-prime (") symbol. As shown, the track system 24" includes a guide rail 26" coupled to each of the sidewalls 14. Each of the side edges 22" of the cover 10" includes a groove 29 formed therein, the groove 29 sized to receive at least a portion of one of the guide rails 26" therein to retain the cover 10" on the sidewalls 14, while a portion of the protective cover 10" overlays each of the sidewalls 14 to minimize water leakage into the truck bed 12. As a non-limiting example, the guide tracks 26" each have a substantially U-shaped in cross section. However, it is understood that the guide tracks 26" may have any shape and size.

FIGS. 7A-7C illustrate a step-by-step process for installing the protective cover 10, 10', 10" according to an embodiment of the present invention. In use, the protective cover 10, 10', 10" is removed from the stored position and unfolded into the expanded protective position. In certain embodiments, the protective cover 10, 10', 10" in the protective position is disposed on a portion of the tail gate 16 to provide additional balance and leverage. It is understood that conventional tailgates have various angle settings that can be used to provide the most appropriate resting height. Where the sidewalls 14 include the track system 24, 24', 24", the protective cover 10, 10', 10" is guided along the track system 24, 24', 24" to retain the cover 10, 10', 10" in the protective position. It is understood that the system 24, 24', 24" can be configured to engage only a portion of the cover 10, 10', 10", thereby allowing a at least a portion of the protective cover 10, 10', 10" to be lifted and spaced from a portion of the sidewalls 14 to allow access to the truck bed 12 without completely removing the cover 10, 10', 10".

In certain embodiments that do not include the track system 24, 24', 24", the protective cover 10 is guided along a top surface of the sidewalls 14 and then coupled using one of any of a variety of coupling means such as a clamp, a tie-down, and a fastener, for example. Once securely coupled to the sidewalls 14, the protective cover 10, 10', 10" encloses the truck bed 12 and shelters the truck bed 12 from the outside environment and inclement weather.

Figure 9:
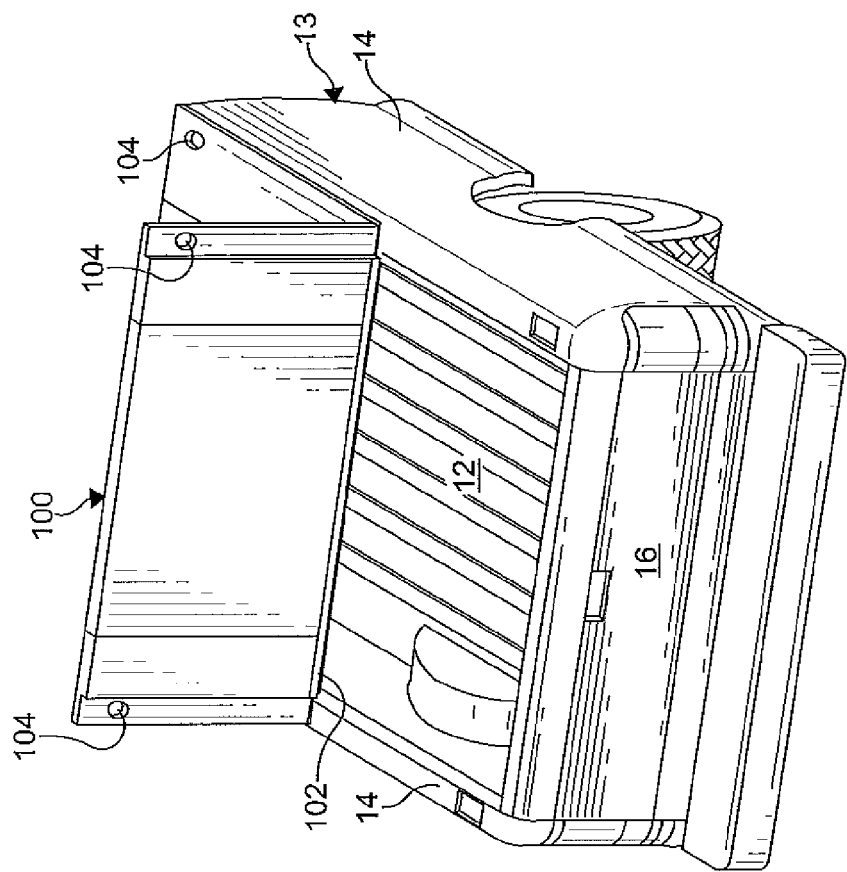
FIG. 9 is a perspective view of a truck bed including the protective cover of FIG. 8 and showing the protective cover in an open position.
Figure 8:
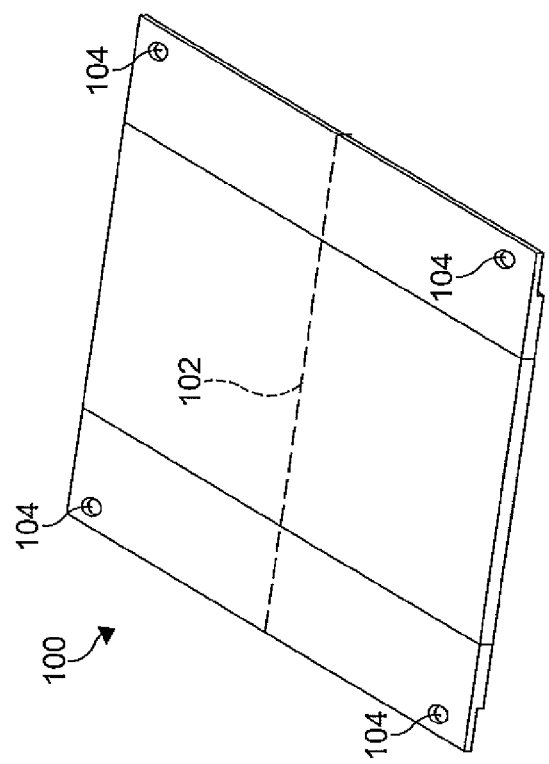
FIG. 8 is a perspective view of a protective cover according to another embodiment of the present invention.

FIGS. 8-9 illustrate the protective cover 100 according to another embodiment of the present invention similar to the protective cover 10 of FIG. 1, except as described below. As shown, the protective cover 100 includes a cross hinge 102 to provide easy access to the truck bed 12 when the protective cover 102 is in the expanded position and coupled to the sidewalls 14. The cross hinge 102 allows a portion of the protective cover 100 to be folded into an open position, thereby providing access to the truck bed 12 while continuing to protect a remaining portion of the truck bed 12. As shown, the protective cover 100 includes a plurality of apertures 104 formed therein. As a non-limiting example, the apertures 104 are positioned adjacent a periphery of the protective cover 100 to maximize the coupling seal between the protective cover 100 and the sidewalls 14 of the truck bed 12. Each of the apertures 104 is adapted to receive a coupling device (not shown) to securely couple the protective cover 100 to the sidewalls 14 of the truck bed 12. As a non-limiting example, the coupling device is at least one of a tie down and a clamping device. However, other coupling devices and systems may be used.

Figure 10:
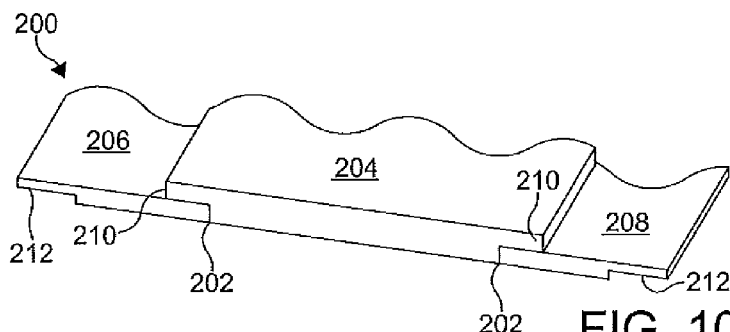
FIG. 10 is a fragmentary perspective view of a protective cover according to another embodiment of the present invention.

FIG. 10 illustrates a protective cover 200 according to another embodiment of the present invention similar to the protective cover 10 of FIGS. 1-3, except as described below. As shown, the protective cover 200 includes a pair of longitudinal seams 202 or hinges, thereby dividing the protective cover into a first portion 204, a second portion 206, and a third portion 208. The first portion 204 is shown as a center portion disposed between the second portion 206 and the third portion 208. The first portion 204 includes a pair of longitudinal flanges 210 disposed on opposite edges thereof. While the cover 200 is in a protective position, the longitudinal flanges 210 are disposed adjacent a top surface of each of the second portion 206 and the third portion 208 to provide enhanced water proofing. The second portion 206 and the third portion 208 each include a longitudinal flange 212 arranged to overlap a portion of an adjacent one of the sidewalls 14.

Figure 11A:
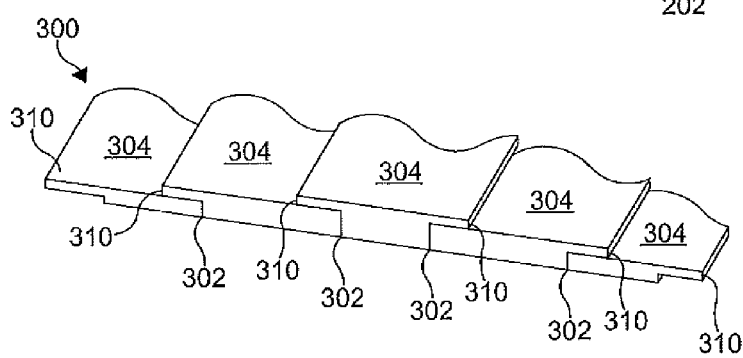
FIG. 11A is a fragmentary perspective view of a protective cover according to another embodiment of the present invention.
Figure 11B:
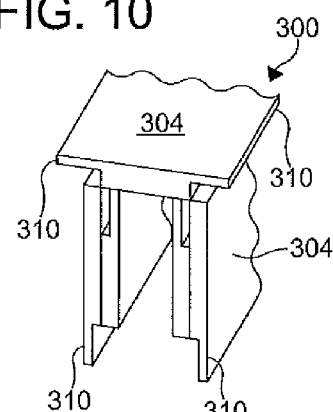
FIG. 11B is a fragmentary perspective view of the protective cover of FIG. 11B, showing the protective cover in a stored position.

FIGS. 11A and 11C illustrate a protective cover 300 according to another embodiment of the present invention similar to the protective cover 200 of FIG. 10, except as described below. As shown, the protective cover 300 includes four longitudinal seams 302, thereby dividing the protective cover 300 into five portions 304. It is understood that the protective cover 300 may include any number of seams and may be divided into any number of portions. Each of the portions 304 includes a longitudinal flange 310. While the cover 300 is in the protective position, each of the flanges 310 is disposed adjacent a top surface of at least one of an adjacent portion 304 and one of the sidewalls 14 to provide enhanced water proofing. Additionally, the protective cover 300 may be folded into a stored position, shown in FIG. 11B.

Figure 12:
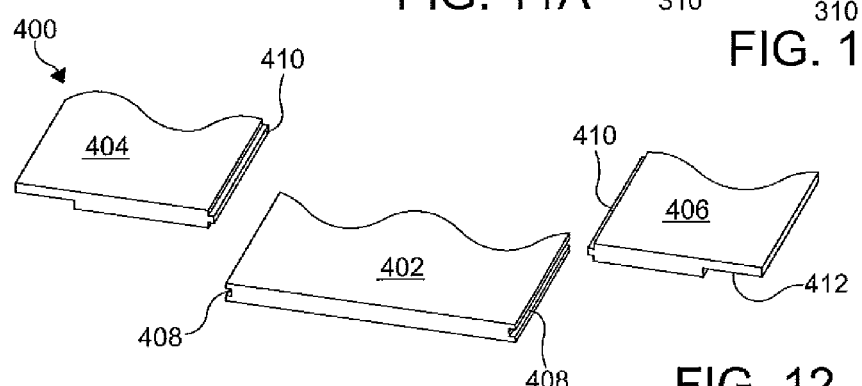
FIG. 12 is a fragmentary perspective view of a protective cover according to another embodiment of the present invention.

FIG. 12 illustrates a protective cover 400 according to another embodiment of the present invention similar to the protective cover 10 of FIGS. 1-3, except as described below. As shown, the protective cover 400 includes a first portion 402, a second portion 404, and a third portion 406. The first portion 402 is shown as a center portion disposed between the second portion 404 and the third portion 406. The second and third portions 404, 406 are coupled to the first portion 402 using a tongue and groove system. Specifically, the first portion 402 includes a groove 408 disposed on opposing edges thereof and each of the second portion 404 and the third portion 406 includes a longitudinal rib or tongue 410 adapted to be received by one of the grooves 408 of the first portion 402. In certain embodiments, each of the second portion 404 and the third portion 406 is coupled to an adjacent one of the sidewalls 14 and the grooves 408 of the first portion 402 are guided along the tongues 410 of the second and third portions 404, 406 to completely enclose the truck bed 12.

Figure 13:
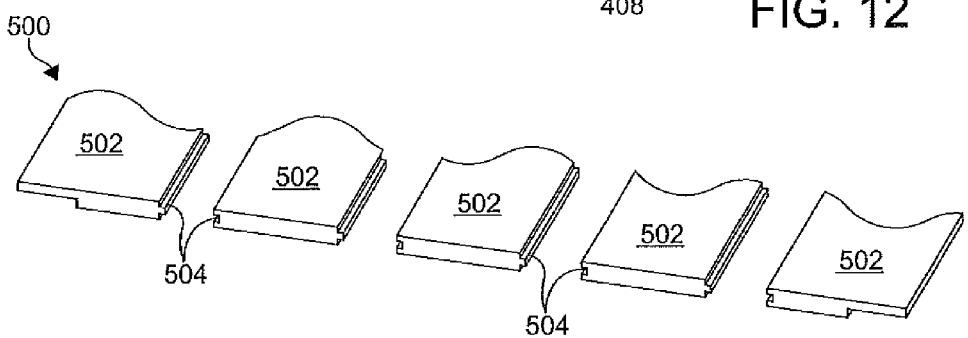
FIG. 13 is a fragmentary perspective view of a protective cover according to another embodiment of the present invention.

FIG. 13 illustrates a protective cover 500 according to another embodiment of the present invention similar to the protective cover 310 of FIG. 12, except as described below. As shown, the protective cover 500 includes five portions 502, wherein each of the portions 502 is coupled to an adjacent portion 502 using a tongue and groove system 504. It is understood the protective cover 500 may be divided into any number of portions, as desired. It is further understood that other coupling devices and systems may be used to couple one of the portions 502 to an adjacent one of the portions 502.

FIGS. 14-15 illustrate a protective cover 600 according to another embodiment of the present invention similar to the protective cover 10 of FIGS. 1-3, except as described below. The protective cover 600 includes a main body 602 and a pair of support elements 603 (i.e. support shelves).

The main body 602 is typically formed from at least one of a polymer, composite, wood, metal, and other suitable rigid or semi-rigid material. The main body 602 has a substantially bottleneck shape with a narrow end 604 and a wide end 606 to allow the main body 602 to lie substantially flat on the truck bed 12, while in a stored position. As shown in FIG. 14, the main body 602 is in a stored position, wherein a narrow end 604 of the main body 602 is disposed adjacent the front wall 15 and the wide end 606 is disposed adjacent the tailgate 16. As a non-limiting example, the main body 602 is sized to lay flat on the truck bed 12 between the wheel wells 20 and substantially parallel to the truck bed 12. As a further non-limiting example, each of a pair of opposing side edges 608 of the main body 602 include a longitudinal flange 610 extending along at least a portion of the side edges 608. In certain embodiments, a plurality of guide plates 612 are coupled to a surface of the main body 602 and arranged to cooperate with the flanges 610 to form a plurality of retainer grooves 614. It is understood that any number of the guide plates 612 can be coupled to any surface of the main body 602. It is further understood that the guide plates 612 can have any size and shape.

Each of the support elements 603 is typically formed from at least one of a polymer, composite, wood, metal, and other suitable rigid or semi-rigid material and is coupled to opposite ones of the sidewalls 14. The support elements 603 each have a pre-defined shape to cooperate with the main body 602 to substantially shelter the truck bed 12 while in the protective position. It is understood that any means of coupling the support elements 603 to the sidewalls 14 can be used. In certain embodiments, the support elements 603 are integrally formed with the sidewalls 14. In certain embodiments, each of the support elements 603 includes a hinge (not shown), wherein a portion of each the support elements 603 can be arranged to extend generally downward adjacent the sidewalls 14 when in the stored position.

In use, the side edges 608 of the main body 602 are disposed adjacent the support elements 603 and the retainer grooves 614 receive an edge of the support elements 603 to limit a range of motion of the main body 602 in at least one dimension and to guide the main body 602 into a protective position, as shown in FIG. 15. In certain embodiments, a portion of the main body 602 is designed to overlap a portion of each of the support elements 603 when in the protective position to minimize leakage into the covered truck bed 12. As a non-limiting example, the main body 602 includes a stop device 616 coupled to a bottom surface of the main body 602 and disposed adjacent the wide end 606 to abut the tailgate 16 while the tailgate 16 is closed.

FIGS. 16-17 illustrate a protective cover 700 according to another embodiment of the present invention similar to the protective cover 10 of FIGS. 1-3, except as described below. The protective cover 700 includes a main body 702 and a pair of hinged support elements 703 (i.e. support shelves).

The main body 702 is typically formed from at least one of a polymer, composite, wood, metal, and other suitable rigid or semi-rigid material. As a non-limiting example, the main body 702 is sized to lay flat on the truck bed 12 between the wheel wells 20 and substantially parallel to the truck bed 12, while in the stored position. As a further non-limiting example, each of a pair of opposing side edges 704 of the main body 702 includes a longitudinal flange 706 extending along at least a portion of the side edges 704. In certain embodiments, a plurality of guide plates 708 are coupled to a lower surface of the main body 702 and arranged to cooperate with the flanges 706 to form a plurality of retainer grooves 710. It is understood that any number of the guide plates 708 can be coupled to any surface of the main body 702. It is further understood that the guide plates 708 can have any size and shape.

Each of the support elements 703 is typically formed from at least one of a polymer, composite, wood, metal, and other suitable rigid or semi-rigid material and is coupled to opposite ones of the sidewalls 14 with a hinge 712. The support elements 703 each have a pre-defined shape to cooperate with the main body 702 to substantially shelter the truck bed 12 while in the protective position. It is understood that any hinge means for coupling the support elements 703 to the sidewalls 14 can be used. As a non-limiting example, the hinges 712 include a tension device to provide additional support to the support elements 703. In certain embodiments, each the support elements 703 includes a plurality of portions 714, wherein each of the portions 714 is hingedly coupled to an adjacent one of the portions 714 to allow the support element 703 to fold upon itself for storage. It is further understood that the support elements 703 can be arranged to extend generally upward from the sidewalls 14 when in the stored position to provide additional height to the sidewalls 14.

In use, the side edges 704 of the main body 702 are disposed adjacent the support elements 703 and the retainer grooves 710 receive an edge of each of the support elements 703 to limit a range of motion of the main body 702 in at least one dimension and to guide the main body 702 into a protective position, shown in FIG. 17. In certain embodiments, a portion of the main body 702 is designed to overlap a portion of each of the support elements 703 when in the protective position to minimize leakage into the covered truck bed 12. As a non-limiting example, the main body 702 includes a stop device 716 coupled to a surface of the main body 702 to abut the tailgate 16 while the tailgate is closed.

FIGS. 18-19 illustrate a protective cover 800 according to another embodiment of the present invention similar to the protective cover 700 of FIGS. 16-17, except as described below. The protective cover 800 includes a main body 802 and a pair of support elements 803 (i.e. support shelves).

The main body 802 is typically formed from at least one of a polymer, composite, wood, metal, and other suitable rigid or semi-rigid material. As a non-limiting example, the main body 802 is sized to lay flat on the truck bed 12 between the wheel wells 20 and substantially parallel to the truck bed 12, while in the stored position. As a further non-limiting example, each of a pair of opposing side edges 804 of the main body 802 includes a longitudinal flange 806 extending along at least a portion of the side edges 804. In certain embodiments, a plurality of guide plates 808 are coupled to a lower surface of the main body 802 and arranged to cooperate with the flanges 806 to form a plurality of retainer grooves 810. It is understood that any number of the guide plates 808 can be coupled to any surface of the main body 802. It is further understood that the guide plates 808 can have any size and shape.

Each of the support elements 803 is typically formed from at least one of a polymer, composite, wood, metal, and other suitable rigid or semi-rigid material and is coupled to opposite ones of the sidewalls 14 with a hinge 812. The support elements 803 each have a pre-defined shape to cooperate with the main body 802 to substantially shelter the truck bed 12, while in the protective position. It is understood that any hinge means for coupling the support elements 803 to the sidewalls 14 can be used. As a non-limiting example, the hinges 812 include a tension device to provide additional support to the support elements 803. It is further understood that the support elements 803 can be arranged to extend generally downward adjacent the sidewalls 14 when in the stored position, as shown in FIG. 18.

In use, the side edges 804 of the main body 802 are disposed adjacent the support elements 803 and the retainer grooves 810 receive an edge of each of the support elements 803 to limit a range of motion of the main body 802 in at least one dimension and to guide the main body 802 into a protective position, shown in FIG. 19. In certain embodiments, a portion of the main body 802 is designed to overlap a portion of each of the support elements 803 when in the protective position to minimize leakage into the covered truck bed 12. As a non-limiting example, the main body 802 includes a stop device 816 coupled to a surface of the main body 802 to abut the tailgate 16 while the tailgate 16 is closed.

Figure 21:
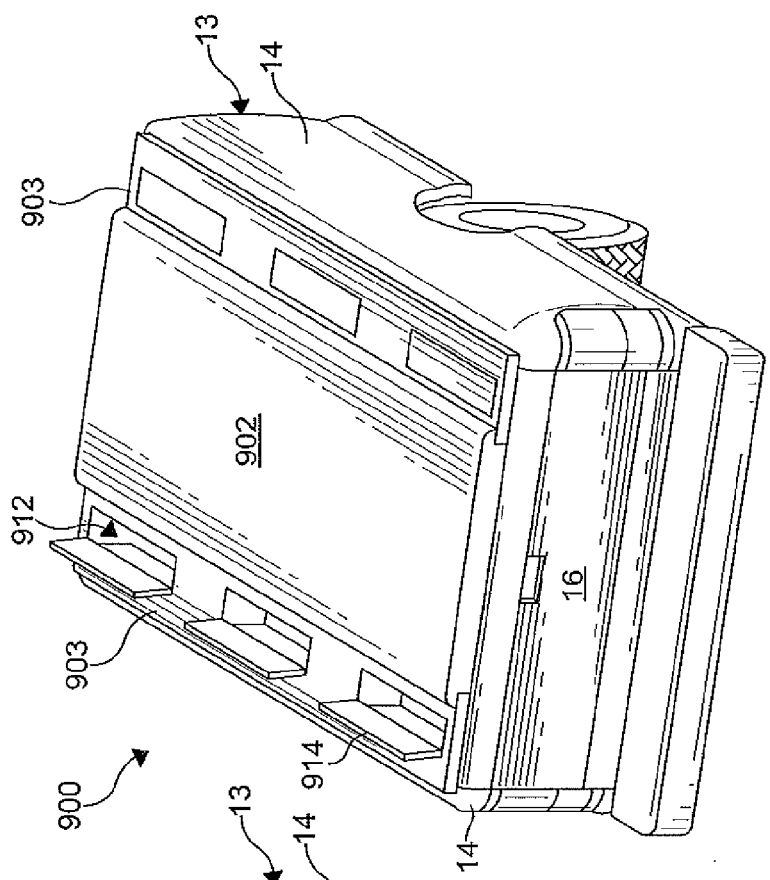
FIG. 21 is a perspective view of a truck bed including the protective cover of FIG. 20, showing the protective cover in an expanded protective position.
Figure 20:
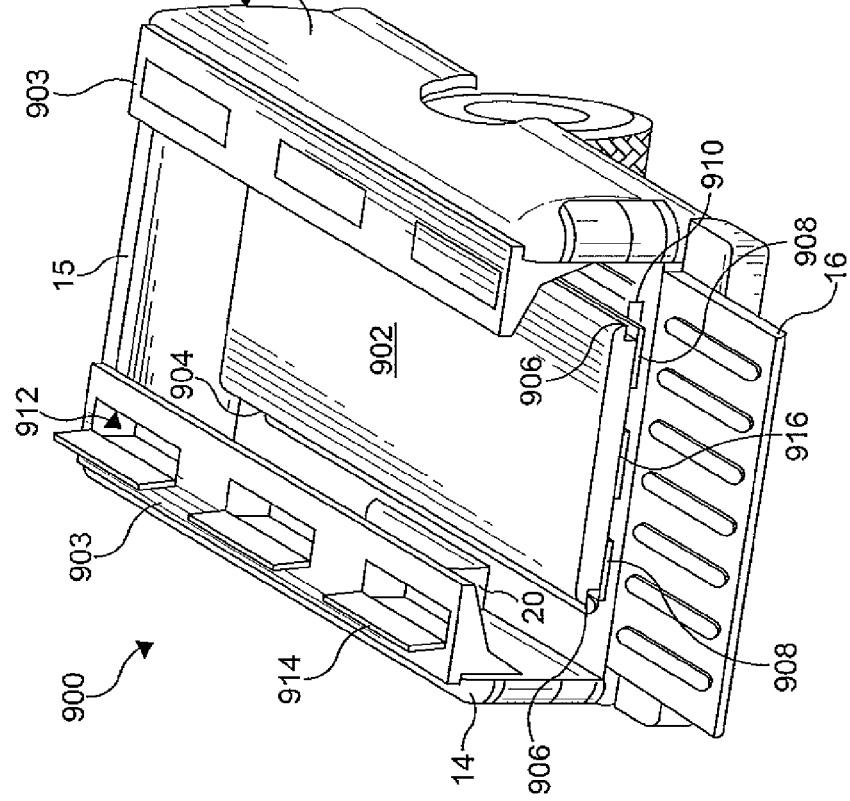
FIG. 20 is a perspective view of a truck bed including a protective cover according to another embodiment of the present invention, showing the protective cover in a stored position.

FIGS. 20-21 illustrate a protective cover 900 according to another embodiment of the present invention similar to the protective cover 600 of FIGS. 14-15, except as described below. The protective cover 900 includes a main body 902 and a pair of support elements 903 (i.e. support shelves).

The main body 902 is typically formed from at least one of a polymer, composite, wood, metal, and other suitable rigid or semi-rigid material. As a non-limiting example, the main body 902 is sized to lay flat on the truck bed 12 between the wheel wells 20 and substantially parallel to the truck bed 12 while in the stored position. As a further non-limiting example, each of a pair of opposing side edges 904 of the main body 902 includes a longitudinal flange 906 extending along at least a portion of the side edges 904. In certain embodiments, a plurality of guide plates 908 is coupled to a surface of the main body 902 and arranged to cooperate with the flanges 906 to form a plurality of retainer grooves 910. It is understood that any number of the guide plates 908 can be coupled to any surface of the main body 902. It is further understood that the guide plates 908 can have any size and shape.

Each of the support elements 903 is typically formed from at least one of a polymer, composite, wood, metal, and other suitable rigid or semi-rigid material and is coupled to opposite ones of the sidewalls 14. The support elements 903 each have a pre-defined shape to cooperate with the main body 902 to substantially shelter the truck bed 12 while in the protective position. As a non-limiting example, each of the support elements 903 includes a plurality of storage bins 912 formed therein. As a further non-limiting example, at least one of the storage bins 912 includes a lid 914 hingedly coupled to the support element 903 to selectively enclose an associated one of the storage bins 912.

In use, the side edges 904 of the main body 902 are disposed adjacent the support elements 903 and the retainer grooves 910 receive an edge of each of the support elements 903 to limit a range of motion of the main body 902 in at least one dimension and to guide the main body 902 into a protective position, shown in FIG. 21. In certain embodiments, a portion of the main body 902 is designed to overlap a portion of each of the support elements 903 when in the protective position to minimize leakage into the covered truck bed 12. As a non-limiting example, the main body 902 includes a stop device 916 coupled to a surface of the main body 902 to abut the tailgate 16 while the tailgate 16 is closed.

Figure 24:
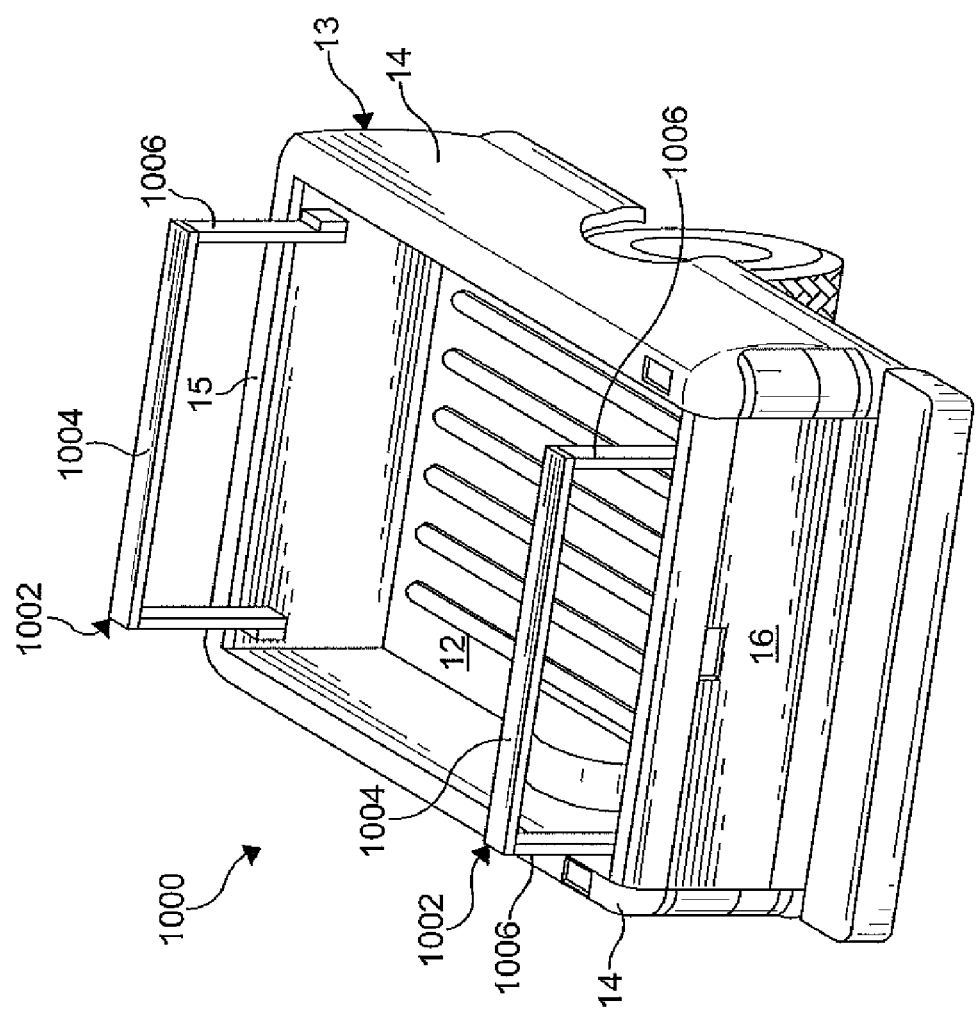

FIGS. 22-24 illustrate a structural support system 1000 according to another embodiment of the present invention. The support system 1000 includes a pair of support elements 1002, wherein one of the support elements 1002 is rotatably mounted to the front wall 15 of the truck bed 12 and the other of the support elements 1002 is rotatably mounted to the tailgate 16. It is understood that any coupling device can be used to mount the support elements to the truck 13. As shown, each of the support elements 1002 includes a cross bar 1004 having an elongate member 1006 coupled to adjacent opposite ends thereof. As a non-limiting example, each of the members 1006 is substantially perpendicular to the cross bar 1004. It is understood that each of the support elements 1002 can include any number of the cross bars 1004 and the members 1006. It is further understood the members 1006 can be disposed at any angle relative to an associated one of the cross bars 1004.

As more clearly shown in FIG. 22, one of the support elements 1006 is coupled to the tailgate 16 of the truck 13 and positioned such that the members 1006 are substantially perpendicular to the tailgate 16. As a non-limiting example, the support element 1002 can provide a leverage surface (i.e. fulcrum) for installing the cover 10.

As shown in FIG. 23, one of the support elements 1002 is coupled to the tailgate 16 of the truck 13 and positioned such that the members 1006 are substantially parallel to the tailgate 16. As a non-limiting example, while the tailgate 16 is in an open position, the support elements 1002 operate to extend an effective length of the truck bed 12 for carrying items that are longer than the truck bed 12.

As shown in FIG. 24, one of the support elements 1002 is coupled to the tailgate 16 of the truck 13 and positioned such that the members 1006 are substantially parallel to the tailgate 16. Another of the support elements 1002 is coupled to the front wall 15 and positioned such that the members 1006 are parallel to the front wall 15. As a non-limiting example, while the tailgate 16 is in a closed position, the support elements 1002 cooperate to form an elevated rack system for hauling items above the truck bed 12. As a further example, a tarp (not shown) may be coupled to each of the support elements 1002 to operate as an elevated covering for protecting the truck bed 12 and contents disposed thereon.

The protective cover 10, 10', 10" 100, 200, 300, 400, 500, 600, 700, 800, 900 provides security, versatility, and fuel economy, while minimizing a required storage space for the protective cover 10, 10', 10" 100, 200, 300, 400, 500, 600, 700, 800, 900 and maximizing ease of installation. While using the tailgate 16 or one of the support elements 1002 as a fulcrum, a single user can remove the cover 10, 10', 10" 100, 200, 300, 400, 500, 600, 700, 800, 900 from the stored position and install the cover 10, 10', 10" 100, 200, 300, 400, 500, 600, 700, 800, 900 in the protective position.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A protective cover for a truck bed having a pair of opposite sidewalls, the protective cover comprising:
a main body selectively configurable in a stored position and a protective position, wherein the main body is disposed adjacent the truck bed while in the stored position and shelters at least a portion of the truck bed while in the protective position; and
a means for securing the main body to at least one of the sidewalls of the truck bed while the main body is in the protective position, wherein the main body includes a plurality of apertures to receive at least a portion of the means for securing the main body.

2. The protective cover according to claim 1, wherein the main body is substantially parallel to the truck bed when in the stored position.

3. The protective cover according to claim 1, wherein the main body includes a plurality of portions, each of the portions of the main body coupled to an adjacent one of the portions using a tongue and groove system.

4. The protective cover according to claim 1, wherein the means for securing the main body includes a guide track coupled to at least one of the sidewalls to receive a portion of the main body.

5. The protective cover according to claim 1, further comprising a support structure coupled to at least one of the sidewalls of the truck bed, wherein the main body is secured to the support structure while the main body is in the protective position.

6. The protective cover according to claim 5, wherein the support structure is configured to shelter a portion of the truck bed and the main body is configured to shelter a remaining portion of the truck bed while the main body is in the protective position.

7. A protective cover for a truck bed having a pair of opposite sidewalls, the protective cover comprising:
a main body selectively configurable in a stored position and a protective position, wherein the main body is disposed adjacent the truck bed while in the stored position and shelters at least a portion of the truck bed while in the protective position;
a means for securing the main body to at least one of the sidewalls of the truck bed while the main body is in the protective position; and
a support structure coupled to at least one of the sidewalls of the truck bed, wherein the main body is secured to the support structure while the main body is in the protective position, and wherein the support structure is hingedly coupled to the at least one of the sidewalls of the truck bed.

8. The protective cover according to claim 5, wherein the support structure includes a storage bin formed therein.

9. A protective cover for a truck bed having a pair of opposite sidewalls, the protective cover comprising:
a main body having a plurality of longitudinal seams arranged substantially parallel to the sidewalls, wherein the main body is foldable along the seams to form a stored position and a protective position, and wherein the main body is disposed adjacent the truck bed while in the stored position and shelters at least a portion of the truck bed while in the protective position; and
a means for securing the main body to the at least one of the sidewalls of the truck bed.

10. The protective cover according to claim 9, wherein the main body is substantially parallel to the truck bed when in the stored position.

11. The protective cover according to claim 9, wherein the main body is disposed between a pair of wheel wells formed in the truck bed while in the stored position.

12. The protective cover according to claim 9, wherein the main body includes a plurality of portions and at least one of the portions overlays an adjacent one of the portions.

13. The protective cover according to claim 9, wherein the main body includes a plurality of apertures to receive at least a portion of the means for securing the main body.

14. The protective cover according to claim 9, wherein the means for securing the main body includes a guide track coupled to at least one of the sidewalls to receive a portion of the main body.

15. The protective cover according to claim 9, wherein the main body includes a cross seam formed therein, the cross seam perpendicular to the longitudinal seams to allow the main body to be folded to expose a portion of the truck bed while providing coverage to a remaining portion of the truck bed.

16. The protective cover according to claim 9, further comprising a support structure coupled to at least one of the sidewalls of the truck bed, wherein the main body is secured to the support structure while the main body is in the protective position.

17. A method for protecting a truck bed, the method comprising the steps of:
providing a protective cover having a main body selectively configurable in a stored position and a protective position, wherein the main body is disposed adjacent the truck bed while in the stored position and shelters at least a portion of the truck bed while in the protective position; and
providing a moveable support member coupled to the bed of the truck;
positioning the support member at a pre-determined position relative to the protective cover;
guiding the protective cover along the support member to remove the cover from the stored position; and
guiding the protective cover along the support member to arrange the cover in the protective position.

18. The method according to claim 17, wherein the protective cover includes a plurality of longitudinal seams, wherein the main body is foldable along the seams to form the stored position and the protective position.

\* \* \* \* \*